United States Patent [19]

Denzinger et al.

[11] Patent Number: 4,559,159
[45] Date of Patent: Dec. 17, 1985

[54] COPOLYMERS, THEIR PREPARATION AND THEIR USE AS ASSISTANTS IN DETERGENTS AND CLEANSING AGENTS

[75] Inventors: Walter Denzinger, Speyer; Heinrich Hartmann, Limburgerhof; Wolfgang Trieselt, Ludwigshafen; Richard Mueller, Bad Durkheim; Paul Diessel, Mutterstadt; Albert Hettche, Hessheim, all of Fed. Rep. of Germany

[73] Assignee: BASF Aktiengesellschaft, Ludwigshafen, Fed. Rep. of Germany

[21] Appl. No.: 580,806

[22] Filed: Feb. 16, 1984

[30] Foreign Application Priority Data

Feb. 18, 1983 [DE] Fed. Rep. of Germany ....... 3305637

[51] Int. Cl.$^4$ .................. C08F 8/14; C08F 220/06; C11D 3/37; D06L 3/02
[52] U.S. Cl. .................. 252/174.24; 8/137; 252/8.9; 252/174.23; 525/327.4; 525/384; 525/385; 526/271
[58] Field of Search ............. 252/174.24, 8.9; 526/240, 318, 271; 525/327.4, 384, 385

[56] References Cited

U.S. PATENT DOCUMENTS

| | | | |
|---|---|---|---|
| 3,308,067 | 3/1967 | Diehl | 252/550 |
| 3,719,647 | 3/1973 | Hardy et al. | 526/240 |
| 4,000,080 | 12/1976 | Bartolotia et al. | 252/99 |

FOREIGN PATENT DOCUMENTS

76992 4/1983 European Pat. Off. .
2137671 10/1984 United Kingdom .

*Primary Examiner*—A. Lionel Clingman
*Attorney, Agent, or Firm*—Oblon, Fisher, Spivak, McClelland & Maier

[57] ABSTRACT

Water-soluble copolymers which consist of from 40 to 90% by weight of one or more ethylenically unsaturated monocarboxylic acids of 3 to 5 carbon atoms, from 60 to 10% by weight of one or more ethylenically unsaturated dicarboxylic acids of 4 to 8 carbon atoms and/or of the corresponding dicarboxylic acid anhydride and, if required, not more than 15% by weight, based on the total weight of the carboxyl-containing monomers, of one or more carboxyl-free monomers, and which are esterified with from 2 to 60% by weight, based on the total weight of the carboxyl-containing monomers, of one or more compounds which contain a terminal hydroxyl group and one or more alkylene oxide groups of 2 to 4 carbon atoms, the preparation of such water-soluble copolymers and their use as assistants in detergents, cleansing and dishwashing agents.

8 Claims, No Drawings

COPOLYMERS, THEIR PREPARATION AND THEIR USE AS ASSISTANTS IN DETERGENTS AND CLEANSING AGENTS

The present invention relates to novel water-soluble copolymers of ethylenically unsaturated mono- and dicarboxylic acids, which may contain as much as 15% by weight of carboxyl-free monomers, and as much as 60% by weight, based on the carboxylic acids, of which are esterified with a special hydroxyl compound, the preparation of copolymers of this type and their use as assistants in detergents, cleansing agents and dishwashing agents.

It is an object of the present invention to provide novel detergent assistants which are capable of completely or partially replacing the phosphates or nitrilotriacetic acid, zeolites and polycarboxylic acids used as builders, and which at the same time impart to surfactants or detergents optimum properties in respect of the primary and secondary detergent actions.

We have found that this object is achieved by water-soluble copolymers which consist of from 40 to 90% by weight of one or more ethylenically unsaturated monocarboxylic acids of 3 to 5 carbon atoms and from 60 to 10% by weight of one or more ethylenically unsaturated dicarboxylic acids of 4 to 8 carbon atoms, and which are esterified with from 2 to 60, preferably from 5 to 50, % by weight, based on the total weight of the mono- and dicarboxylic acids in the non-esterified form, of one or more compounds of the formula I

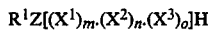

where $R^1$ is $C_1$–$C_{18}$-alkyl or alkylphenyl where alkyl is of 1 to 12 carbon atoms, Z is oxygen or a

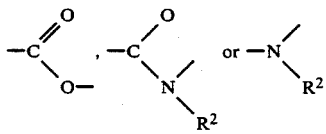

group, $R^2$ is hydrogen, a group of the formula $-(X^1)_m \cdot (X^2)_n \cdot (X^3)_o]H$ or alkyl of 1 to 4 carbon atoms, $X^1$ is a copolymerized ethylene oxide unit, $X^2$ is a copolymerized propylene oxide unit, $X^3$ is a copolymerized butylene oxide unit and m, n and o are each an integer from 0 to 100, the sum m+n+o being from 1 to 100 and the alkylene oxide units being copolymerized as blocks in any desired sequence or being copolymerized statistically, and their water-soluble salts.

Ethylenically unsaturated monocarboxylic acids as monomers are, in particular, acrylic acid, methacrylic acid, crotonic acid or vinyllactic acid, of which acrylic acid and methacrylic acid are preferred, and acrylic acid is particularly preferred.

Ethylenically unsaturated dicarboxylic acids as monomers are, in particular, maleic acid, fumaric acid, aconitic acid, itaconic acid, mesaconic acid, citraconic acid and methylenemalonic acid, of which maleic acid is particularly preferred.

As is familiar to one skilled in the art, the dicarboxylic acids can be replaced by their anhydrides where these exist. Where reference is made to the total weight of the mono- and dicarboxylic acids or to the total weight of the carboxyl-containing monomers in the statement of weight ratios below, these terms are intended to include any dicarboxylic acid anhydrides present, these being calculated as the free acids. In accordance with the definition, a mixture of several monomeric monocarboxylic acids and/or monomeric dicarboxylic acids can be used in each case. Examples of such monomer mixtures are mixtures of acrylic acid with methacrylic acid and of maleic acid with itaconic acid.

However, one monocarboxylic acid and one dicarboxylic acid are preferably used in each case.

The preferred copolymers contain from 40 to 70% by weight of monocarboxylic acid, in particular acrylic acid, units and from 30 to 60% by weight of dicarboxylic acid or anhydride, in particular maleic acid or anhydride, units, calculated as free carboxylic acids and based on the total weight of the mono- and dicarboxylic acids in the non-esterified form.

The novel copolymers are partially esterified with compounds of the formula 1. From 2 to 60, preferably from 5 to 50, % by weight, based on the total weight of the mono- and dicarboxylic acids present in the copolymer, of these compounds are bonded to carboxyl groups of the copolymer. The lower part of this range is preferred for compounds of the formula I which have few alkylene oxide units, whereas the upper part of this range is preferred for those having a large number of alkylene oxide units; however, there is no sharp boundary. Below the lower limiting amount, the efficiency of the novel products gradually decreases, in particular in respect of inhibition of redeposition. On the other hand, the reinforcement of the primary detergent action and the inhibition of encrustation decrease in the region of the upper limit, the decrease being sharper beyond the upper limit. Novel copolymers which are esterified with from 8 to 30% by weight of one or more compounds of the formula I are particularly advantageous with regard to the two effects.

In the compounds of the formula I, suitable alkyl radicals $R^1$ are, for example, straight-chain or branched $C_1$–$C_{18}$-alkyl, such as methyl, ethyl, isopropyl, n- and iso-butyl, ethylhexyl, isodecyl, isotridecyl, alkyl derived from coconut oil, industrial mixtures, such as $C_{13}/C_{15}$- and $C_{12}/C_{14}$-alkyl, $C_{16}/C_{18}$-alkyl (alkyl derived from tallow fat) and stearyl, while suitable alkylphenyl radicals are, for example, ethylphenyl, isopropylphenyl, n-and iso-octylphenyl, dodecylphenyl and nonylphenyl.

The stated alkylene oxide units can be present both as copolymerized blocks in any desired sequence and as a statistical distribution, in accordance with the definition the sum of m, n and o being not less than 1 for the copolymerized monomer units. The compound of the formula I must thus contain not less than one alkylene oxide group. The upper limit of 100 alkylene oxide groups per polyglycol ether chain in the compound of the formula I is not based on technical requirements (since there is no indication that compounds having longer chains will be useless), but on the fact that the commercially available substances of the formula I contain not more than about 100 alkylene oxide groups. The hydroxy compounds used for the esterification are known, or are obtainable by a conventional method; some of them are produced industrially as compounds having surfactant properties.

For example, the following compounds having OH groups are suitable:

| | | $R^1Z[(X^1)_m.(X^2)_n.(X^3)_o]H$ | | | | |
|---|---|---|---|---|---|---|
| No. | $R^1$ | Z | $X^1$ $(C_2H_4O)$ m | $X^2$ $(C_3H_6O)$ n | $X^3$ $(C_4H_8O)$ o | Alkylene oxide distribution |
| 1 | $CH_3$ | O | 2 | — | — | Block |
| 2 | $C_2H_5$ | " | 2 | — | — | " |
| 3 | " | " | 3 | — | — | " |
| 4 | $C_4H_9$, n | " | 2 | — | — | " |
| 5 | $C_4H_9$, iso | " | 3 | — | — | " |
| 6 | $CH_3$ | " | — | 1 | — | " |
| 7 | $C_{13}/C_{15}$—Alkyl, iso (1) | " | 3 | — | — | " |
| 8 | " | " | 5 | — | — | " |
| 9 | " | " | 7 | — | — | " |
| 10 | " | " | 8 | — | — | " |
| 11 | " | " | 10 | — | — | " |
| 12 | " | " | 11 | — | — | " |
| 13 | " | " | 12 | — | — | " |
| 14 | " | " | 30 | — | — | " |
| 15 | $C_{12}/C_{14}$—Alkyl (2) | " | 8 | — | — | " |
| 16 | $C_{16}/C_{18}$—Alkyl (3) | " | 11 | — | — | " |
| 17 | " | " | 18 | — | — | " |
| 18 | " | " | 25 | — | — | " |
| 19 | " | " | 50 | — | — | " |
| 20 | " | " | 80 | — | — | " |
| 21 | $C_{10}$—Alkyl, iso (1) | " | 3 | — | — | " |
| 22 | " | " | 5 | — | — | " |
| 23 | " | " | 6 | — | — | " |
| 24 | " | " | 7 | — | — | " |
| 25 | " | " | 11 | — | — | " |
| 26 | Octylphenol | O | 6 | — | — | " |
| 27 | Nonylphenol | " | 7 | — | — | " |
| 28 | " | " | 8 | — | — | " |
| 29 | " | " | 9 | — | — | " |
| 30 | " | " | 10 | — | — | " |
| 31 | " | " | 14 | — | — | " |
| 32 | " | " | 20 | — | — | " |
| 33 | Oleyl | $-CH_2-NH-$ | 12 | — | — | " |
| 34 | " | $-C(=O)-NH-$ | 10 | — | — | " |
| 35 | " | $-C(=O)-O-$ | 6 | — | — | " |
| 36 | $C_{13}/C_{15}$—Alkyl (1) | O | 16 | 4 | — | " |
| 37 | " | " | 2 | 4 | — | " |
| 38 | " | " | 9 | — | 2 | " |
| 39 | " | " | 8 | 7 | — | statistical |
| 40 | $C_{13}/C_{15}$—Alkyl (1) | O | 6 | 13 | — | Block |
| 41 | " | O | 6 | 4 | — | " |
| 42 | " | O | 12 | 16 | — | " |
| 43 | " | O | 5 | 7 | — | " |
| 44 | " | O | 4 | 2 | — | " |
| 45 | $C_9/C_{11}$—Alkyl (1) | O | 7 | 1 | — | " |
| 46 | $CH_3$ | O | — | 3 | 1 | " |
| 47 | $C_2H_5$ | O | 4 | 2 | 1 | " |
| 48 | Nonylphenol | O | 25 | 6 | 2 | " |

(1) from oxo synthesis
(2) from Ziegler synthesis
(3) from tallow fat

The copolymers according to the invention can additionally be modified by incorporating as copolymerized units, in the preparation, not more than 15%, based on the total weight of the carboxyl-containing monomers in their non-esterified form, of carboxyl-free ethylenically unsaturated monomers which still lead to polymers which, at least in their salt form, are water-soluble. Examples of such carboxyl-free monomers are amides, alkyl esters, with or without hydroxyl or amino groups in the ester radical, alcohols, sulfonic acids and ethers with ethylenically unsaturated radicals, olefins, diolefins and styrene.

Specific examples of carboxyl-free monomers are acrylamide, methacrylamide, 2-acrylamido-2-methylpropanesulfonic acid, vinylsulfonic acid, allylsulfonic acid, vinylphosphonic acid, allylphosphonic acid, vinyl acetate, vinyl propionate, methyl acrylate and methacrylate, ethyl acrylate and methacrylate, hydroxyethyl acrylate and methacrylate, hydroxypropyl acrylate and methacrylate, dialkylaminoethyl acrylate and methacrylate, vinylglycol, allyl alcohol, ethylene, propylene, isobutylene, methyl vinyl ether, ethyl vinyl ether, isobutyl vinyl ether, styrene and butadiene; the addition of 2-acrylamino-2-methylpropanesulfonic acid, vinylphosphonic acid, vinyl acetate, vinyl propionate, hydroxypropyl acrylate, dialkylaminoalkyl acrylate, dialkylaminoalkyl methacrylate and methyl vinyl ether is preferred.

The novel copolymers according to the invention can be prepared by 2 methods:

1. By esterification of the copolymers of monocarboxylic acids and dicarboxylic acids and/or their anhydrides and, if required, a carboxyl-free monomer with a compound of the formula I in a conventional manner, or
2. by copolymerization of monocarboxylic acids, dicarboxylic acids and/or their anhydrides and, if required, carboxyl-free monomers with esters of the monocarboxylic acids and/or mono- and/or diesters of the dicarboxylic acids with a compound of the formula I in a conventional manner. These esters correspond to the formulae II and III

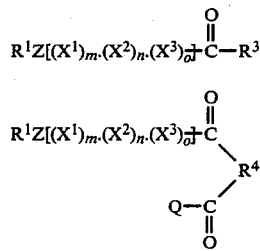

where $R^3$ is a carboxyl-free radical, containing 2 to 4 carbon atoms, of an ethylenically unsaturated monocarboxylic acid, $R^4$ is a carboxyl-free radical, containing 2 to 6 carbon atoms, of an ethylenically unsaturated dicarboxylic acid, Q is hydroxyl or a radical of the formula $R^1Z[(X^1)_m \cdot (X^2)_n \cdot (X^3)_o]—$, and $R^1$, Z, $X^1$, $X^2$, $X^3$, m, n and o have the meanings given above for formula I.

In the first process, the starting materials are polymers of monocarboxylic acids and dicarboxylic acids or anhydrides with, if appropriate, a carboxyl-free monomer, as are obtainable in accordance with, for example, German Patent Applications P 31 38 574.5, P 31 40 383.2, P 31 47 489.6, P 32 33 777.9, P 32 33 775.2 or P 32 33 776.0; the polymers obtained by drying are esterified, in an inert solvent, eg. toluene or xylene, in the presence of a conventional esterification catalyst, with a compound of the formula I. Polymers which are particularly suitable for the esterification are the copolymers of monocarboxylic acids and dicarboxylic acid anhydrides which have previously been prepared by suspension or precipitation polymerization in aliphatic and/or aromatic hydrocarbons, in accordance with, for example, German Patent Applications P 32 33 777.9 and P 32 33 775.2.

In this case, the esterification can be carried out directly in the medium in which the polymerization has taken place. The procedure is particularly simple if the polymers containing dicarboxylic acid anhydride groups are esterified only as far as the formation of the monoester. In this case, the expensive procedure of separating off water can be dispensed with. Of course, the reaction of free carboxyl groups with the compounds of the formula I may also take place, in which case the water formed has to be removed from the system.

The second process is particularly preferred. The monomeric esters of the formulae II and/or III which are required for this process can be prepared by a conventional method, by esterifying ethylenically unsaturated mono- and/or dicarboxylic acids or their anhydrides of the type described above with compounds of the formula I, in the presence of a catalyst, eg. p-toluenesulfonic acid, sulfuric acid or the like, for example in toluene, at from 110° to 150° C., any water formed being separated off. In order to prevent polymerization during the esterification, it is advisable to carry out the process in the presence of a conventional stabilizer, eg. hydroquinone monomethyl ether. In this case too, the monoesters of the formula III where Q is OH can be prepared in a particularly simple manner by reacting a compound of the formula I with a dicarboxylic acid anhydride at from 100° to 150° C. in the absence of a solvent.

In the second process, the copolymers can be prepared by suspension polymerization, precipitation polymerization or solution polymerization, solution polymerization in water being preferred.

In the case of suspension polymerization, the copolymerization is carried out in a solvent in which the monomers are insoluble or partially soluble and the copolymers are insoluble and are therefore precipitated. For suspension polymerization, the addition of a protective colloid to prevent aggregate formation is absolutely necessary. Examples of suitable solvents are straight-chain and branched aliphatic and cycloaliphatic hydrocarbons, but any other solvent which satisfies the stated requirements can be used. Examples of preferred solvents are pentane, hexane, heptane, octane, isooctane, cyclohexane, methylcyclohexane, dimethylcyclohexane and diethylcyclohexane, cyclohexane, methylcyclohexane and isooctane being particularly preferred. Suitable protective colloids for preventing aggregate formation are polymeric substances which are readily soluble in the solvents, do not react with the monomers and are very hydrophilic. Examples of suitable substances are copolymers of maleic anhydride with vinyl alkyl ethers where alkyl is of 10 to 20 carbon atoms, or with olefins of 8 to 20 carbon atoms, as well as their derivatives in which the maleic acid units carry one or two ester groups of $C_{10}$–$C_{20}$-alcohols or one or two amide groups of $C_{10}$–$C_{20}$-alkylamines, and polyalkyl vinyl ethers where alkyl is of 1 to 20 carbon atoms, eg. polymethyl vinyl ether, polyethyl vinyl ether and polyisobutyl vinyl ether, which are also preferred compounds. The amounts of protective colloid added are usually from 0.05 to 4, preferably 0.1 to 2, % by weight, based on the monomers employed; it is often particularly advantageous to use a combination of several protective colloids.

In the case of precipitation polymerization, the copolymerization is carried out in a solvent in which the monomers are soluble, and the polymers are insoluble and are precipitated. Suitable solvents for this method are alkyl-substituted benzene hydrocarbons and aliphatic halohydrocarbons, as well as mixtures of these; however, any other solvent which satisfies the stated requirements can also be used. Examples of preferred solvents are toluene, p-xylene, m-xylene, o-xylene and their industrial mixtures, ethylbenzene, diethylbenzene, methylethylbenzene, methylene chloride, 1,1- and 1,2-dichloroethane, 1,1,1-trichloroethane, 1,1,2-trichloroethane, 1,1,2-trichloroethane, perchloroethylene, 1,2-dichloropropane, butyl chloride, 1,1,2-trichloro-1,2,2-trifluoroethane, 1,1,1,2-tetrachloro-2,2-difluoroethane and 1,1,2,2-tetrachloro-1,2-difluoroethane, toluene, xylene in the form of its industrial mixtures, 1,1,1-trichloroethane and the stated fluorochlorohydrocarbons being preferred, and toluene being particularly important industrially.

In carrying out the precipitation polymerization, also, it is often advantageous to add a protective colloid to prevent aggregate formation, particularly when concentrations of 50% and higher are employed. Suitable protective colloids are the polymeric substances mentioned above as being suitable for the suspension polymerization. The amounts of protective colloid used are also usually of the same order of magnitude as stated above.

The following criteria apply to both suspension polymerization and precipitation polymerization:

The polymerization concentrations are from 20 to 70%, preferably from 30 to 60%.

To obtain copolymers having low residual contents of monomeric dicarboxylic acid or monomeric dicarboxylic acid anhydride, not less than ⅓ of the amount of the dicarboxylic acid or of the dicarboxylic acid anhydride, together with the solvent, is initially introduced into the reactor, and the remaining amount of dicarboxylic acid or dicarboxylic acid anhydride is fed in over ⅔ of the feed time of the monocarboxylic acid. It is generally advantageous to introduce initially the total amount of the dicarboxylic acid anhydride into the reactor. The monocarboxylic acid must always be fed, feed times of from 2 to 10, preferably from 3 to 7, hours being required. Either some or all of the ester components of the formulae II and/or III and, if required, the carboxyl-free comonomer can be initially introduced, or these compounds can be metered in together with the monocarboxylic acid.

The polymerization temperature is from 50° to 180°

By concomitantly using redox coinitiators, for example benzoin, dimethylaniline or complexes or salts, which are soluble in organic solvents, of heavy metals, such as copper, cobalt, manganese, iron, nickel or chromium, the half-lives of the stated peroxides, particularly the hydroperoxides, can be reduced, so that, for example, tert.-butyl hydroperoxide in the presence of 5 ppm of copper(II) acetylacetonate is effective at as low as 100° C.

Apparatuses which are suitable for the polymerization are conventional stirred kettles, for example those equipped with anchor stirrers, paddle stirrers, impeller stirrers or multistage impulse countercurrent agitators. Particularly suitable apparatuses are those which permit direct isolation of the solid product after the polymerization, eg. paddle driers.

The polymer suspensions obtained can be dried directly in evaporators, such as belt driers, blade driers, spray driers or fluidized-bed driers. However, it is also possible to separate off the polymer from the major part of the solvents by filtration or centrifuging and, if necessary, to remove residues of initiator, monomers and protective colloids by washing with fresh solvents, and only then to dry the polymer.

In general, and particularly when protective colloids are present, the copolymers are obtained in the form of fine powders, which can often be mixed directly with detergent powders or granules. However, it is often advantageous first to convert the copolymer powders to salts by mixing with alkali metal carbonates and only then to mix these salts with the detergents.

By adding water and then distilling off the solvent with steam, it is also possible to convert the copolymer suspension to an aqueous polymer solution, which can, as required, then be neutralized with alkali, amines, salts, in particular the sodium salts. However, ammonium salts and organic amine salts, such as the salts of the tri-$C_1$–$C_4$-alkylamines, of hydroxyethylamine or of the mono-, di- or tri-$C_1$–$C_4$-alkanolamines, or mixtures of these, are also suitable and are sometimes advantageous.

The polymerization is carried out in the presence of free-radical initiators. Examples of water-soluble free-radical initiators which are suitable for the polymerization are hydrogen peroxide, peroxydisulfates, especially Na peroxydisulfate or ammonium peroxydisulfate, or azobis(2-aminopropane)hydrochloride. Hydrogen peroxide is preferably used, and a mixture of hydrogen peroxide and a peroxydisulfate is very particularly preferred.

From 0.5 to 5% by weight, based on the sum of the monomers, of the initiators is present in the mixture. The polymerization takes place in an aqueous medium, and the concentration is advantageously chosen so that the aqueous solution contains from 20 to 70, preferably from 40 to 60, % by weight of total monomers. The reaction temperature can vary within wide limits, but is advantageously chosen to be from 60° to 150° C., preferably from 100° to 130° C. If the reaction is carried out at above the boiling point of water, a pressure-tight vessel, such as an autoclave, is chosen as the reaction vessel.

Furthermore, the regulators conventionally used for free-radical polymerization in an aqueous medium, eg. thioglycolic acid or $C_1$–$C_4$-aldehydes, or chain lengtheners, such as methylene bisacrylamide or divinyl glycol, can be employed, the amounts used being from 0.1 to 2% by weight and from 0.5 to 5% by weight respectively, and the percentages being based on the total amount of the monomers.

The polymers have K values of from 8 to 80, in general from 20 to 60, these values being measured in 2% strength aqueous solution.

It is often advantageous completely to neutralize the copolymers after the polymerization. Depending on whether the copolymers are to be used in pulverulent or liquid detergents, preferred neutralizing agents are alkali metal hydroxides or alkanolamines, in particular ethanolamine, diethanolamine or triethanolamine.

Because of their properties, the novel copolymers can advantageously be used as builders in detergents, and can therefore be employed instead of phosphates.

In pulverulent detergents, they increase the primary detergent action, prevent redeposition onto the washed white material and reduce encrustation. Of particular industrial importance is the fact that the antiredeposition action is effective not only in the case of pure cotton but to a considerable extent also in the case of the widely used cotton/polyester blends. The new copolymers thus combine properties which are often obtained in practice by using a particular assistant. Moreover, they are effective as stabilizers for per compounds and as softeners for the fibers to be treated.

When they are used in liquid detergents which do not contain phosphate, the compatibility with purely ionic polyelectrolytes is substantially more advantageous, so that there is less tendency for phase separation to occur.

The novel copolymers can also be very advantageously used as builders in dishwashing agents and cleansing agents.

Accordingly, the present invention also relates to pulverulent and liquid detergent formulations, washing agent formulations and cleansing agent formulations which contain from 0.5 to 10% by weight of the novel copolymers, in addition to the conventional components.

In the detergents which have a reduced phosphate content, ie. under the present legislation in those having a phosphate content of about 20%, based on the total weight, particularly suitable amounts are as much as about 5% by weight; in the phosphate-free detergents, higher amounts, ie. about 2–10% by weight, are advantageous.

Such detergents contain, for example, additional anionic surfactants, such as alkylbenzenesulfonic acid salts, soaps, fatty alcohol sulfates, olefin-sulfates or paraffin-sulfonates, non-ionic surfactants, such as fatty alcohol polyglycol ethers or alkylphenol polyglycol ethers, zwitterionic surfactants, solubilizers, such as xylene- or cumenesulfonates, glycols or alcohols, bleaching agents, such as sodium perborate, bleach activators and standardizing agents, such as sodium sulfate, particularly in pulverulent detergent formulations, and, if required, further builders, sodium triphosphate and optical brighteners, enzymes, perfume oils and/or fragrance materials and foam regulators, as are well known to one skilled in the art.

Preferred detergents according to the invention are those which are free of complex-forming phosphonic acids. Depending on the particular intended use, washing agents and cleansing agents contain, in addition to the abovementioned surfactants and other additives, for example, alkaline substances and components which eliminate chlorine.

The Examples which follow illustrate the invention. Parts are by weight, unless stated otherwise. Parts by volume bear the same relation to parts by weight as that of the liter to the kilogram. The K values were measured in accordance with H. Fikentscher, Cellulosechemie 13 (1932), 60, in 2% strength solution in water at 25° C. Examples of the preparation of the polymers

EXAMPLES 1 TO 3

In a reactor provided with a stirrer, 182 parts of a 55% strength suspension of a copolymer of 55% by weight of acrylic acid and 45% by weight of maleic anhydride (K value 40) in xylene were heated for 2.5 hours at 80° C. with the amount, shown in the Table, of an alkyl polyglycol ether which consists of a $C_{13}$–$C_{15}$-oxoalcohol having an ethylene oxide block of 7 units, and with 0.5 part of p-toluenesulfonic acid. Thereafter, the mixture was diluted with 150 parts of water, and the xylene was distilled off by passing in steam, until a temperature of 100° C. was reached. The mixture was cooled, neutralized with triethanolamine until the pH was 7.0–7.5, and then diluted once again with 150 parts of water.

| Example No. | Amount of alcohol added (parts) | Solids content (%) | Appearance of the solution |
| --- | --- | --- | --- |
| 1 | 12 | 18.6 | pale yellow, clear |
| 2 | 24 | 24.3 | yellow, clear |
| 3 | 48 | 18.7 | yellow, clear |

EXAMPLES 4 TO 22

In a reactor provided with a stirrer, 336 parts of fully demineralized water, maleic anhydride (see Table for amount) and sodium hydroxide (see Table for amount)

were heated at the boil, a mixture of 299 parts of fully demineralized water, acrylic acid (see Table for amount) and a monoester of maleic acid and an OH-containing compound (see Table for type and amount) was metered in over 5 hours, and a solution consisting of 185 parts of fully demineralized water, 4.65 parts of sodium peroxydisulfate and 15.45 parts of 30% strength hydrogen peroxide was metered in over 6 hours. Thereafter, the mixture was heated for a further 2 hours, then cooled, and neutralized further with triethanolamine.

EXAMPLES 27 TO 32

In a reactor provided with a stirrer, 336 parts of fully demineralized water, a dicarboxylic acid or its anhydride, and sodium hydroxide were heated at the boil (100° C.), a mixture of 299 parts of fully demineralized water, an unsaturated monocarboxylic acid, where relevant a carboxyl-free unsaturated monomer and an ester of an unsaturated carboxylic acid with an OH-containing compound was metered in over 4 hours, and a solu-

TABLE

| Example No. | MAA parts | NaOH parts | AA parts | Monoester of MA with OH compound parts | type of OH compound | Solids content (%) | K value |
|---|---|---|---|---|---|---|---|
| 4 | 186.1 | 136.7 | 220.3 | 23.2 | methyldiglycol | 47.1 | 39.1 |
| 5 | 176.3 | 129.5 | 208.7 | 46.4 | methyldiglycol | 47.3 | 36.3 |
| 6 | 156.7 | 115.8 | 185.5 | 92.8 | methyldiglycol | 45.9 | 31.6 |
| 7 | 186.1 | 136.7 | 220.3 | 23.2 | ethyltriglycol | 47.8 | 39.7 |
| 8 | 176.3 | 129.5 | 208.7 | 46.4 | ethyltriglycol | 47.3 | 36.0 |
| 9 | 156.7 | 115.8 | 185.5 | 92.8 | ethyltriglycol | 45.7 | 32.2 |
| 10 | 186.1 | 136.7 | 220.3 | 23.2 | butyldiglycol | 46.8 | 40.1 |
| 11 | 176.3 | 129.5 | 208.7 | 46.4 | butyldiglycol | 47.9 | 37.1 |
| 12 | 156.7 | 115.8 | 185.5 | 92.8 | butyldiglycol | 47.0 | 30.4 |
| 13 | 186.1 | 136.7 | 220.3 | 23.2 | $C_{13}$-$C_{15}$—alcohol + 3 EO | 46.6 | 39.8 |
| 14 | 176.3 | 129.3 | 208.7 | 46.4 | $C_{13}$-$C_{15}$—alcohol + 3 EO | 46.1 | 37.6 |
| 15 | 156.7 | 115.8 | 185.5 | 92.8 | $C_{13}$-$C_{15}$—alcohol + 3 EO | 45.7 | 34.9 |
| 16 | 186.1 | 136.7 | 220.3 | 23.2 | $C_{13}$-$C_{15}$—alcohol + 7 EO | 47.0 | 39.5 |
| 17 | 176.3 | 129.5 | 208.7 | 46.4 | $C_{13}$-$C_{15}$—alcohol + 7 EO | 36.6 | |
| 18 | 156.7 | 115.8 | 185.5 | 92.8 | $C_{13}$-$C_{15}$—alcohol + 7 EO | 46.3 | 34.5 |
| 19 | 137.1 | 100.7 | 162.3 | 131.9 | $C_{13}$-$C_{15}$—alcohol + 7 EO | 44.7 | 33.5 |
| 20 | 186.1 | 136.7 | 220.3 | 23.2 | $C_{16}$-$C_{18}$—alcohol + 3 EO | 46.8 | 39.2 |
| 21 | 176.3 | 129.5 | 208.7 | 46.4 | $C_{16}$-$C_{18}$—alcohol + 3 EO | 46.3 | 37.0 |
| 22 | 156.7 | 115.8 | 185.5 | 92.8 | $C_{16}$-$C_{18}$—alcohol + 3 EO | 45.9 | 33.0 |

MAA = maleic anyhdride
AA = acrylic acid
MA = maleic acid
EO = ethylene oxide

EXAMPLES 23 TO 26

The procedure described in Examples 4 to 22 was followed, except that, instead of the maleates, esters of acrylic acid with an OH-containing compound were employed (see Table).

tion of 15.45 parts of 30% strength hydrogen peroxide and 4.65 parts of sodium peroxydisulfate in 100 parts of fully demineralized water was metered in over 5 hours. Thereafter, the mixture was heated for a further 2 hours at 100° C., then cooled, and neutralized further with triethanolamine. The types and amounts of the mono-

| Example No. | MAA parts | NaOH parts | AAA parts | Ester of acrylic acid with OH compound parts | type of OH compound | Solids content (%) | K value |
|---|---|---|---|---|---|---|---|
| 23 | 186.1 | 136.7 | 220.3 | 23.2 | $C_{13}$-$C_{15}$—alcohol + 12 EO | 47.7 | 40.0 |
| 24 | 176.3 | 129.5 | 208.7 | 46.4 | $C_{13}$-$C_{15}$—alcohol + 12 EO | 47.7 | 37.5 |
| 25 | 156.7 | 115.8 | 185.5 | 92.75 | $C_{13}$-$C_{15}$—alcohol + 12 EO | 50.7 | 32.0 |
| 26 | 176.3 | 129.5 | 208.7 | 46.4 | $C_{16}$-$C_{18}$—alcohol + 25 EO | 47.4 | 37.0 | mers employed are shown in the Table below.

TABLE FOR EXAMPLES 27 TO 32

| Example No. | Dicarboxylic acid or anhydride type | parts | NaOH parts | Mono-carboxylic acid type | parts | COOH—free monomer type | parts | Ester of unsaturated carboxylic acid with OH—containing compound type | parts | Solids content (%) | K value |
|---|---|---|---|---|---|---|---|---|---|---|---|
| 27 | MAA IA | 39.2 92.7 | 80 | AA | 231.9 | — | — | di-methyl-diglycol maleate | 92.7 | 47.9 | 42.0 |
| 28 | MAA | 117.5 | 86.4 | AA | 208.7 | AMPS | 46.4 | maleic acid mono-[$C_{16}$/$C_{18}$—tallow fatty alcohol + 80 EO] ester | 69.6 | 50.3 | 63.5 |
| 29 | MAA | 156.7 | 115.2 | AA MAS | 139.1 92.7 | — | — | maleic acid mono-[$C_{13}$/$C_{15}$—oxoalcohol + 16 EO + 4 PO] ester | 46.4 | 47.4 | 40.0 |
| 30 | IA | 139 | 77 | AA | 231.9 | VAc | 46.4 | maleic acid mono-[$C_{13}$/$C_{15}$—oxoalcohol + 9 EO + 2 BO] ester | 46.4 | 48.3 | 53.5 |
| 31 | MAA | 156.7 | 115.2 | AA | 185.5 | DEAEA | 46.4 | maleic acid mono-[$C_{13}$/$C_{15}$—oxoalcohol + 7 PO + 8 EO] ester | 46.4 | 47.9 | 36.5 |

TABLE FOR EXAMPLES 27 TO 32 -continued

| Example No. | Dicarboxylic acid or anhydride type | parts | NaOH parts | Mono- carboxylic acid type | parts | COOH—free monomer type | parts | Ester of unsaturated carboxylic acid with OH—containing compound type | parts | Solids content (%) | K value |
|---|---|---|---|---|---|---|---|---|---|---|---|
| 32 | MAA | 117.6 | 86.4 | AA | 208.7 | AM | 23.2 | acrylic acid [$C_{16}/C_{18}$ tallow fatty alcohol + 80 EO] ester | 92.8 | 47.6 | 56.0 |

MAA = maleic anhydride
IA = itaconic acid
AA = acrylic acid
MAS = methacrylic acid
AMPS = 2-acrylamido-2-methylpropylsulfonic acid
VAc = vinyl acetate
DEAEA = diethylaminoethyl acrylate
AM = acrylamide
EO = ethylene oxide
PO = propylene oxide
BO = butylene oxide In Example 31, PO and EO are statistically distributed; in the remaining examples, the esters contain polyalkylene oxide blocks in the sequence stated.

EXAMPLE 33

In a reactor provided with a stirrer, 136 parts of maleic anhydride, 550 parts of an industrial mixture of xylene isomers, and 2.4 parts of a polyethyl vinyl ether having a K value of 50 (measured on a 1% strength solution in cyclohexanone), as a 70% strength solution in toluene, were heated in a gentle stream of nitrogen, and a mixture of 136 parts of acrylic acid, 34 parts of hydroxyethyl acrylate and 45 parts of the monoester of maleic acid with (oleamide +10 ethylene oxide units), and a solution of 3.4 parts of tert.-butyl peroctoate in 50 parts of xylene, were metered in uniformly in the course of 3 hours. Thereafter, the mixture was heated to the boil (134° C.), a solution of 3.4 parts of di-tert.-butyl peroxide in 50 parts of xylene was metered in over 1 hour, and heating was continued after 1 hour. The viscous polymer suspension was discharged onto a glass dish, and the xylene was evaporated in a drying oven at 70° C. under reduced pressure from a waterpump. 100 parts of the dry product were mixed with 53 parts of pulverulent sodium hydroxide for 12 hours in a ball mill, and this product could be added directly to pulverulent detergents, or could be converted to an aqueous solution and then added to detergent slurries or liquid detergent formulations.

The K value of the sodium salt of the copolymer was 43.

EXAMPLE 34

In a reactor provided with a stirrer, 500 parts of cyclohexane, 96 parts of maleic anhydride and 7 parts of a polyethyl vinyl ether having a K value of 50 (measured on a 1% strength solution in cyclohexanone), as a 70% strength solution in toluene, were heated to the boil (82° C.), a mixture of 72 parts of acrylic acid and 36 parts of the ester of acrylic acid with oleic acid +6 ethylene oxide units was metered in uniformly in the course of 3 hours, 36 parts of vinyl methyl ether were metered in uniformly in the course of 4 hours, and a solution of 3.6 parts of tert.-butyl peroctoate in 80 parts of cyclohexane was metered in uniformly in the course of 5 hours. Thereafter, heating was continued for a further 2 hours. The slightly viscous suspension was then dried in a spray drier. 100 parts of the dry product were mixed with 69 parts of potassium hydroxide powder for 12 hours in a ball mill. The polymer powder could be added directly to pulverulent detergents, or could be converted to an aqueous solution and then added to detergent slurries or liquid detergent formulations.

The K value of the potassium salt was 58.

Examples of the reinforcement of the primary washing action of liquid detergents.

Test conditions

The washing tests were carried out in a Launder-Ometer from Atlas, Chicago, USA, the temperature being 60° C., the duration of washing 30 minutes, the water hardness 2.5 millimoles of Ca/liter and the liquor ratio 1:50 (250 ml).

Test fabric: 5 g samples of WFK standard soiled cloth (cotton test fabric from Wäschereiforschungsanstalt Krefeld)

Detergent dose: 5 g/liter of liquid detergent

Detergent A tested (commercial liquid detergent):
  19% of the $C_{13}/C_{15}$ fatty alcohol + about 7 moles of EO,
  15% of an alkylbenzenesulfonate (Na salt), calculated as 100%,
  14% of an Na salt of a fatty acid (soap),
  3% of free fatty acid,
  5% of triethanolamine,
  7% of ethanol,
  1% of polypropylene glycol and
  35% of water
  remainder: optical brightener, opacifier, perfume oil, dye and enzymes.

Detergent B tested had the following composition:
  10% of dodecylbenzenesulfonate (Na salt) calculated as 100%,
  20% of a $C_{13}/C_{15}$ fatty alcohol +7 moles of EO,
  15% of potassium coconut oil soap (30% strength),
  1% of polypropylene glycol (molecular weight 600) and about 53% of water,
remainder: optical brightener and perfume oil.

Test results: primary detergent action—% diffuse reflectance (measured with Elrepho)

| Substance added to the detergent | Degree of whiteness Detergent A | Detergent B |
|---|---|---|
| no additive | 72.0 | 71.0 |
| 10% of product from Example 1 | 78.0 | 74.0 |
| 5% of product from Example 1 | 76.1 | 75.5 |
| 10% of product from Example 6 | 78.2 | 75.4 |
| 10% of product from Example 11 | 80.0 | 75.0 |
| 5% of product from Example 11 | 78.0 | 74.0 |
| 5% of product from Example 16 | 77.5 | 74.0 |

-continued

| Substance added to the detergent | Degree of whiteness | |
|---|---|---|
| | Detergent A | Detergent B |
| 2% of product from Example 16 | 73.5 | 72.6 |
| 10% of product from Example 5 | 77.0 | 75.4 |
| 5% of product from Example 5 | 75.2 | 74.1 |
| 2% of product from Example 5 | 73.5 | 73.1 |
| 10% of product from Example 13 | 80.0 | 78.0 |
| 10% of product from Example 14 | 80.5 | 78.8 |

The human eye is capable of distinguishing between degrees of whiteness whose diffuse reflectances differ by as little as 1–2%.

Examples of the improved compatibility of the novel copolymers in a liquid detergent

| Detergent formulations: | C | D | E | F | G | H @ |
|---|---|---|---|---|---|---|
| $C_{13}/C_{15}$-oxoalcohol heptaglycol ether | 22 | 22 | 22 | 22 | 22 | 22 |
| Coconut fatty acid | 8.8 | 8.8 | 8.8 | 8.8 | 8.8 | 8.8 |
| Triethanolamine | 13.2 | 13.2 | 13.2 | 13.2 | 13.2 | 13.2 |
| Ethanol | 7 | 7 | 7 | 7 | 7 | 7 |
| MAA/AA copolymer (K value 36) | — | 2 | 3 | | | |
| Copolymer according to Example 17 | | | | 2 | 3 | |
| Copolymer according to Example 16 | | | | | | 3 |
| Stability | cle | clo | cs | cle | cle | cle |
| Degree of whiteness | 72.7 | 75.1 | 75.5 | 75.0 | 75.5 | 75.4 |

(% diffuse reflectance)

cle = clear liquid
clo = cloudy liquid
cs = cloudy liquid which separates after a short time After the primary detergent action had been measured, the degree of whiteness was measured as described in the preceding Example.

The numbers in the Table are percentages by weight; these are made up to 100 with water.

Detergents F to H can be mixed with the novel copolymers to give clear liquid formulations, which have a more powerful detergent action.

Examples of improvement of the primary detergent action, of the redeposition-inhibiting action on cotton, polyester fabrics and cotton/polyester blends, and of the encrustation-inhibiting action in the case of pulverulent detergents.

Test conditions

Test apparatus: Launder-Ometer from Atlas, Chicago.
30 minutes at 35°–60° C.
Water hardness: 3 millimoles of Ca/liter
Liquid ratio 1:10 (250 ml)
Test fabric:
  10 g of cotton terry cloth, bleached
  5 g of cotton/polyester blend (BASF warehouse No. 778)
  5 g of polyester fabric (BASF warehouse No. 626)
  5 g of WFK standard soiled fabric (cotton test fabric from Wäschereiforschungsanstalt Krefeld).
Detergent solution:
  5 g/liter of detergent of the following composition:
  10% of a dodecylbenzenesulfonate
  5% of tallow fatty alcohol +11 moles of EO
  3% of soap flakes
  20% of sodium triphosphate
  20% of sodium perborate
  20% of sodium sulfate
  3% of 60% strength carboxymethylcellulose and
  2.5% of the novel product to be tested, calculated as 100%.

The three white test materials were washed 10 times in succession together with the standard soiled cloth, which was replaced with a fresh one for each wash.

The degree of whiteness of the initially white fabric after 10 washes represents the redeposition effect (secondary detergent action), while the average degree of whiteness of the 10 samples of the standard soiled fabric gives the primary detergent action. In addition, the terry cloths are ashed at 600° C., and the resulting ash content is a measure of the encrustation.

| | Test results: Washing assistant added | Degree of whiteness in % (Elrepho) | | | | % Ash |
|---|---|---|---|---|---|---|
| | | Terrycloth | PES/CT | PES | WKF | Terrycloth |
| 1 | no additive | 75.2 | 45.7 | 43.4 | 54.8 | 2.38 |
| 2 | tallow fatty alcohol + 11 moles of EO | 73.7 | 46.2 | 43.5 | 54.5 | 2.39 |
| 3 | dodecylbenzenesulfonate | 74.7 | 45.3 | 43.6 | 56.2 | 2.42 |
| 4 | 30:70 MAA/AA copolymer | 86.4 | 40.0 | 42.1 | 60.2 | 0.18 |
| 5 | MAA/MVE copolymer | 86.5 | 40.2 | 41.9 | 58.6 | 0.51 |
| 6 | Product from Example 1 | 85.8 | 43.2 | 43.2 | 56.5 | 0.71 |
| 7 | Product from Example 4 | 86.8 | 44.8 | 42.9 | 59.2 | 0.50 |
| 8 | Product from Example 5 | 85.9 | 44.2 | 43.0 | 57.9 | 0.50 |
| 9 | Product from Example 6 | 85.3 | 45.2 | 43.1 | 58.0 | 0.62 |
| 10 | Product from Example 11 | 86.0 | 44.3 | 43.0 | 58.1 | 0.50 |
| 11 | Product from Example 16 | 85.7 | 44.7 | 44.2 | 57.1 | 0.42 |
| 12 | Product from Example 17 | 85.7 | 44.5 | 43.3 | 58.5 | 0.46 |
| 13 | Product from Example 21 | 86.3 | 45.2 | 43.5 | 59.1 | 0.46 |

MVE = methyl vinyl ether

The Table shows clearly that the novel products, even when used in an amount as small as 2.5%, based on the pulverulent detergent, have the same, very powerful redeposition-inhibiting action on cotton terry cloth as do carboxyl-containing copolymers which do not contain any ester groups (Lines 4 and 5 in the Table). They are also similar to these in respect of the reduction in the encrustation and the improvement of the primary detergent action (last and penultimate columns in the Table). Lines 1 and 3 show the results for other comparative solutions which do not contain the novel copolymer, and in which the copolymer is replaced with a corresponding amount of a non-ionic (line 2) or anionic (line 3) surfactant.

The progress over the products from lines 4 and 5 is manifested particularly in the redeposition effect on polyester/cotton blends and on pure polyester fabric (columns 4 and 5).

While the compounds (from lines 4 and 5) which contain only carboxyl groups increase the redeposition very substantially in the case of blends and slightly, but with a recognizable trend, in the case of the polyester material used, these effects being in contrast to those found in the case of cotton, the novel compounds produce virtually no deterioration in the values compared with lines 1 to 3, and, considered over all the properties tested, are thus superior to the prior art products from lines 4 and 5.

We claim:

1. A water-soluble copolymer, which consists of: from 40–90% by weight of at least one ethylenically unsaturated monocarboxylic acid of 3–5 carbon atoms and from 60–10% by weight of at least one ethylenically unsaturated dicarboxylic acid of 4–8 carbon atoms and/or the corresponding dicarboxylic anhydride, said water-soluble copolymer being esterified with from 5–50% by weight, based on the total weight of the carboxylic acids and, where relevant, of the carboxylic acid anhydrides, of at least one compound of formula I:

$$R^1Z[(X^1)m.(X^2)n.(X^3)o]H$$

wherein $R^1$ is $C_1$–$C_{18}$-alkyl or alkylphenyl, wherein said alkyl substituent is of 1 to 12 carbon atoms, Z is oxygen or a

group, $R^2$ is hydrogen or a group of the formula $[(X^1)_m.(X^2)n.(X^3)o]H$ or alkyl of 1 to 4 carbon atoms, $X^1$ is a copolymerized ethylene oxide unit, $X^2$ is a copolymerized propylene oxide unit, $X^3$ is a copolymerized butylene oxide unit and m, n, o are each 0 or an integer up to 100, the sum of m+n+o being from 1 to 100 and the alkylene oxide units being copolymerized as blocks in any desired sequence or being copolymerized statistically, and its water-soluble salts.

2. The copolymer as claimed in claim 1, which contains from 40 to 70% of monocarboxylic acid units and from 60 to 30% of dicarboxylic acid (anhydride) units, the percentages being based on the total weight, calculated as free carboxylic acids, of monomers containing carboxyl groups, carboxylic acid anhydride groups and carboxylic ester groups.

3. The copolymer as claimed in claim 1, which contains, as copolymerized units, acrylic acid as the monocarboxylic acid and maleic acid (anhydride) as the dicarboxylic acid (anhydride).

4. The copolymer as claimed in claim 1, which contains, as copolymerized units, not more than 15%, based on the total weight of the carboxyl-containing monomers in their non-esterified form, of carboxyl-free monomers.

5. The copolymer as claimed in claim 1, which is esterified with a compound of the formula I, where $R^1$ is alkyl of 1 to 18 carbon atoms, Z is oxygen and o is zero.

6. The copolymer as claimed in claim 1, which is esterified with from 8 to 30%, based on the total weight of carboxyl-containing monomers, of at least one compounds of the formula I.

7. A pulverulent or liquid formulation of a detergent, of a washing agent or of a cleansing agent, which formulation contains a copolymer as claimed in claim 1.

8. A pulverulent or liquid formulation of a detergent, of a washing agent or of a cleansing agent, which formulation contains, in addition to conventional components, from 0.5 to 10% by weight of a copolymer as claimed in claim 1.

* * * * *